United States Patent
Pedersen

(10) Patent No.: US 9,751,505 B1
(45) Date of Patent: Sep. 5, 2017

(54) VEHICLE AIR DRYER

(71) Applicant: Morten Pedersen, Calgary (CA)

(72) Inventor: Morten Pedersen, Calgary (CA)

(*) Notice: Subject to any disclaimer, the term of this patent is extended or adjusted under 35 U.S.C. 154(b) by 0 days.

(21) Appl. No.: 15/181,784

(22) Filed: Jun. 14, 2016

(51) Int. Cl.
- F26B 19/00 (2006.01)
- B60S 3/00 (2006.01)
- F26B 21/00 (2006.01)
- B60S 3/04 (2006.01)

(52) U.S. Cl.
CPC ........... B60S 3/002 (2013.01); F26B 21/004 (2013.01); *B60S 3/04* (2013.01); *F26B 2210/12* (2013.01)

(58) Field of Classification Search
CPC .......... B60S 3/002; B60S 3/04; F26B 21/004; F26B 2210/12
See application file for complete search history.

(56) References Cited

U.S. PATENT DOCUMENTS

| | | | |
|---|---|---|---|
| 3,570,042 A | 3/1971 | Solomon | |
| 3,583,686 A * | 6/1971 | Mackey | B60S 3/002 34/105 |
| 3,613,255 A | 10/1971 | Capra | |
| 3,765,104 A | 10/1973 | Takeuchi | |
| 3,877,107 A | 4/1975 | Cirino | |
| 4,365,423 A * | 12/1982 | Arter | F26B 13/10 118/58 |
| 4,393,602 A * | 7/1983 | Smith | B60S 3/002 15/316.1 |
| 4,446,592 A | 5/1984 | McElroy | |
| 4,589,160 A | 5/1986 | Day et al. | |
| 4,622,714 A | 11/1986 | Tomasello | |
| 4,700,426 A | 10/1987 | McElroy | |
| 4,809,392 A | 3/1989 | Larson et al. | |
| 4,949,423 A | 8/1990 | Larson et al. | |
| 5,553,346 A | 9/1996 | McElroy | |
| 5,599,229 A * | 2/1997 | Claunch | D21F 5/18 34/492 |
| 5,960,564 A | 10/1999 | McElroy et al. | |
| 6,154,916 A | 12/2000 | Ayers | |
| 2004/0250372 A1 | 12/2004 | McElroy | |

* cited by examiner

*Primary Examiner* — Jessica Yuen
*Assistant Examiner* — Jiping Lu
(74) *Attorney, Agent, or Firm* — Maxey Law Offices, PLLC; Stephen Lewellyn

(57) ABSTRACT

A vehicle air dryer for removing water from a vehicle as the vehicle emerges from a car wash includes a plenum, a source of pressurized air, a slot nozzle, and a screen. The plenum extends a length, has an annular wall, and defines an interior cavity to hold air. The plenum also defines inlet and outlet ports communicating with the interior cavity. The source of pressurized air is in fluid communication with the inlet port of the plenum. The slot nozzle has an outlet in fluid communication with the outlet port, an inlet spaced from the outlet and in fluid communication with the interior cavity, and an interior passageway extending between the outlet and the inlet. The screen can be disposed between the inlet of the slot nozzle and the interior cavity.

18 Claims, 6 Drawing Sheets

VEHICLE AIR DRYER

FIELD OF THE INVENTION

The present invention relates generally to vehicle air dryers used in car washes, and more particularly, relating to a vehicle air dryer having an improved design providing an elongated high pressure air stream with a low horsepower blower.

BACKGROUND OF THE INVENTION

Vehicle air dyers are commonly used in car washes to dry vehicles as they exit the car wash. Conventionally, vehicle air dryers include one or more high flow blowers arranged around the exit of the car wash. Each blower is connected to one or more nozzles that are designed to direct air toward the surface of the vehicle to remove the water from the surface as the vehicle exits the car wash. Numerous constructions have been provided that are aimed toward solving the problem of removing water from the vehicle surface rather than merely blowing the water around the surface. In an attempt to increase water removal, a trend has been to use larger, more powerful blowers to increase air flow and improve drying. While using high powered blowers may increase water removal and improve drying, they also have large energy consumption, which is undesirable. Accordingly, a need exists for a new vehicle air dryer construction that is capable of using smaller, more energy efficient blowers while providing effective vehicle drying.

SUMMARY OF THE INVENTION

Embodiments of the invention provide a vehicle air dryer construction address the foregoing need by providing an improved vehicle air dryer construction that is capable of using smaller horsepower blowers while providing elongated high pressure air stream.

In one aspect, a vehicle dryer is provided that has a plenum extending a length along an axis between opposite ends and has an annular wall extending about the axis. The plenum defines an interior cavity and is configured to hold air at a pressure greater than atmospheric pressure. The plenum also defines inlet and outlet ports communicating with the interior cavity. A source of pressurized air is connected in fluid communication with the inlet port of the plenum. A slot nozzle has an outlet in fluid communication with the outlet port, an inlet spaced from the outlet and in fluid communication with the interior cavity and an interior passageway extending between the outlet and the inlet. A screen is disposed between the inlet of the slot nozzle and the interior cavity.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
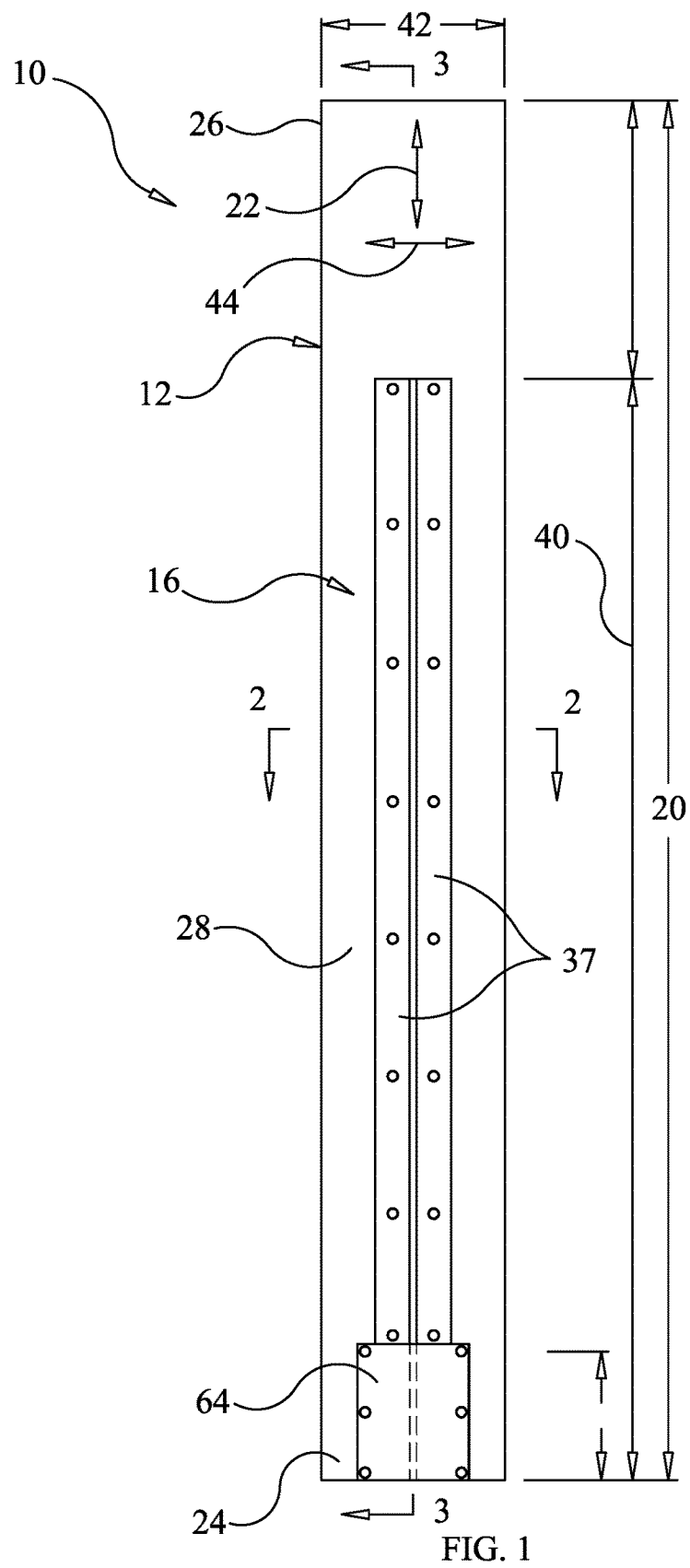
FIG. 1 is a diagrammatic front view of a vehicle air dryer constructed in accordance with an embodiment of the invention.

With reference to FIGS. 1-5 of the drawings, there is representatively illustrated a vehicle air dryer 10 according to an embodiment of the invention. The vehicle air dryer 10 is particularly useful in carwash drying systems to dry vehicles as they exit the carwash. Further, as discussed below, the vehicle air dryer 10 has a particular construction that provides an elongated, high pressure air stream while utilizing a relatively low horsepower blower when compared to existing vehicle air dyers that require high horsepower blowers to operate as effectively.

As depicted, in the representative embodiment, the vehicle air dryer 10 includes a plenum 12 constructed to be connected to a source of pressurized air, such as a blower 14 (seen in FIGS. 6 and 7) and a slot nozzle 16. The plenum 12 is generally elongated and extends a length 20 along axis 22 between opposite ends 24 and 26 and has width 42 along axis 44. The plenum 12 has an annular wall 28 that extends about axis 22. The annular wall 28 and the ends 24 and 26 define an interior cavity 30 in which the plenum 12 is capable of holding air at a pressure greater than atmospheric pressure.

In the representatively depicted embodiment, the plenum 12 has a circular cross-section and said annual wall 28 is cylindrical shaped. While the plenum is shown here to have a circular cross-section, in alternative embodiments, the plenum 12 could be formed to have other cross-sectional shapes, such as, for example square, rectangular, triangular, or elliptical, etc. Thus, the plenum 12 should not be limited the depicted circular cross-sectional shape. The plenum 12 and the other components of the vehicle air dryer 10 can be constructed from many suitable materials, including, but not limited to stainless steel, sheet metal, galvanized metal, copper, or plastics.

As representatively shown end 26 is open. It should be noted, however, depending upon application, end 26 may be closed while end 24 is open, both ends could be closed, or both ends could be opened. The plenum 12 defines an elongated outlet port 34 that is formed through the annular wall 28 of the plenum. The outlet and inlet ports 34 and 36 fluidly communicate with the interior cavity 30. The exemplary outlet port 34 of the plenum 12 is a slot or slit formed through the annular wall 28, open at the bottom end 24 and closed at the opposite end. The exemplary outlet port 34 can be generally rectangular shaped, with a width 38 (FIG. 2) and a length 40 (FIG. 1).

The slot nozzle 16 has a pair of spaced sidewalls 15 and 17 and end plates 19 and 21 that are connected to opposite ends of the sidewalls 15 and 17, there by forming a passage way 50 extending between an outlet 46 and an inlet 48. The inlet 48 spaced from the outlet 46 and is in fluid communication with the interior cavity 30. The exemplary slot nozzle 16 extends along the vertical axis 22 and is inserted into the outlet 34, slid into position through the bottom end 24, for example, and positioned at least partially within the plenum 12. The slot nozzle 16 extends through outlet 34 and flanges 37 are sealed against the plenum with a seal or sealing compound. The exemplary outlet 46 and the exemplary outlet port 34 are positioned closer to one another than either is positioned relative to the inlet 48.

The slot nozzle 16 further includes a screen 18 that disposed between the inlet 48 of the slot nozzle 16 and the interior cavity 30. The screen 18 can define a perforation pattern of fifty percent open space. The perforations can be any shape. The exemplary screen 18 is defined by first and second screen halves 52, 54. Each screen half 52, 54 can be substantially planar. Each screen half 52, 54 extends along axis 22. The screen halves 52, 54 can be inserted into the interior cavity 30 through the bottom end 24.

The slot nozzle 16 divides the interior cavity 30 into a primary chamber 55 and a secondary chamber 56. The secondary chamber 56 can be defined fluidly between the screen 18 and the inlet 48. Defined fluidly between refers to the fact that air will pass from the primary chamber 55, through the screen 18 and into the secondary chamber 56, out of the secondary chamber 56 and into the inlet 48 of the slot nozzle 16. The secondary chamber 56 is sized smaller than a volume of the interior cavity 30 and larger than a volume defined by the interior passageway 50 of the slot nozzle 16.

The slot nozzle further includes a plate 58 that connects the ends of the screen halves 52, 54 that are distal with respect to the inlet 48 to close the secondary chamber 56. The plate 58 can be solid or perforated. Alternatively, the ends of the screen halves 52, 54 that are distal with respect to the inlet 48 can be joined to the inner surface of the annular wall 28 to close the secondary chamber 56. An upper cap 19 encloses a top of the secondary chamber 56 and a top of the interior passageway 50. A lower cap 21 encloses a bottom of the secondary chamber 56 and a bottom of the interior passageway 50. It is noted that the slot nozzle can be assembled together and then inserted into the interior cavity 30. A blocking plate 64 is attached to the plenum 12 to close off and seal the portion of the outlet port 34 that the slot nozzle 16 does not extend through when in its installed position, i.e., after inserting the slot nozzle into the plenum.

Figure 2:
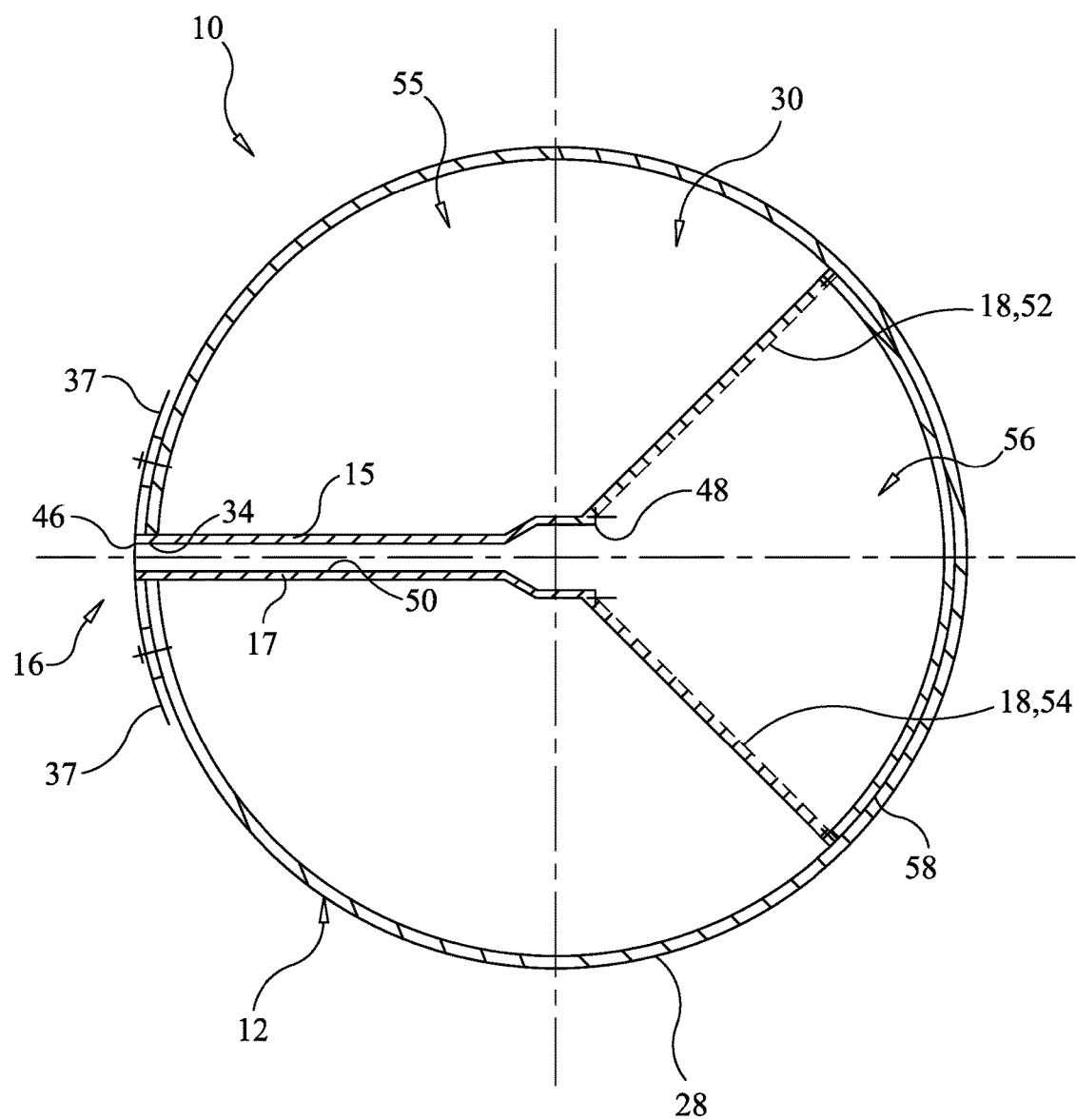
FIG. 2 is a cross-sectional view of the vehicle air dryer taken along line 2-2 in FIG. 1.

The secondary chamber 56 is thus positioned within the interior cavity 30. As best shown in FIG. 2, the exemplary secondary chamber 56 can narrow in width in a plane perpendicular to axis 22 (the viewing perspective of FIG. 2) from a widest width spaced from the inlet 48 of the slot nozzle 16 to a narrowest width proximate to the inlet 48 of the slot nozzle 16.

In a representative embodiment, the width 42 of the plenum 12 can be sixteen inches and the length 20 of the plenum 12 can be ten feet. The width 38 of the outlet port 34 and outlet 46 can be between one-half to three-quarter of an inch. The length 40 of the outlet port 34, outlet 46, the slot nozzle 16, and the screen 18 can be eight feet. The width 38 of the outlet port 46 can thus be less than five percent of the length 40 of the outlet port 46.

Further, the plenum 12 defines a plenum planar profile (best seen in FIG. 1) equal to the width 42 multiplied by a length 20. The outlet port 46 also defines an outlet planar profile equal to the width of the outlet port 46 multiplied by the length 40. The outlet planar profile can thus be less than ten percent of the plenum planar profile. The width 38 of the outlet port 46 can be less than twenty percent of the width 42 of the plenum 12.

The dimensions of the outlet port 46 relative to the plenum 12 are not a matter of design choice. The dimensions were determined as result of testing and development. The dimensions represent a compromise between the size of the plenum 12, pressurized air availability, and desired spraying power. The larger the outlet port 46 relative to the plenum 12, the lower the speed of the air coming out of the outlet port 46. The larger the outlet port 46 and the plenum 12, the larger the size of the necessary pressurized air source 14. The dimensions of the exemplary allow for a single fan powered by a twenty horse-power engine to cause air flow at a velocity of 10,000-12,000 feet per minute (fpm). No system in the art is capable of generating this performance. The arrangement of the screen 18 results in an even velocity of air leaving the slot nozzle 16 along the entire height of the slot nozzle 16. The outlet velocity can be about 10,000 fpm, while the pressure inside the primary chamber 55 is at about 10 to 12" of water column.

Figure 5:
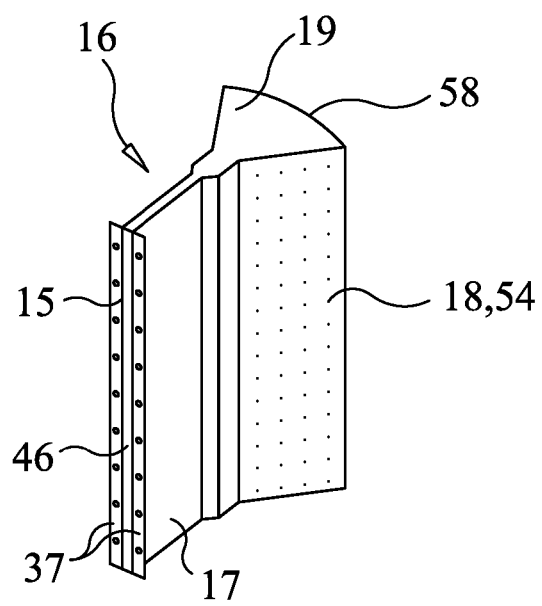
FIG. 5 is a diagrammatic perspective view of a slot nozzle of a vehicle air dryer constructed in accordance with an embodiment of the invention.

Turning now to FIG. 5, there is shown an overhead schematic view of a car wash dryer system incorporating a plurality of vehicle air dyers 10. The structures shown in FIG. 4 can be positioned at the exit of an automatic car wash. Plenum 12 is positioned to blow air from a passenger side of a vehicle. The air stream is directed along the axis 66. A second plenum 12b similar to the plenum 12 is positioned to blow air from a driver side of the vehicle, with an air stream directed along the axis 66b. The plenums 12, 12b can be a distance 72 apart, such as ten feet. The plenum 12a is positioned to blow air from a top of the vehicle. The source 14 is a blower drawing air through an inlet 68 and delivering the air to a manifold 70. Air is communicated to the plenums 12, 12b from the manifold 70. Air is communicated from the manifold 70 through a conduit 74 to the plenum 12a. Thus, a single source such as a twenty horsepower blower can satisfactorily deliver air to three plenums at one time. The two vertical plenums 12 and 12b can be ten feet apart in order for the cars to pass through and the direction of the axes 66, 66b can each be at angle of about five degrees away from collinear. The top horizontal plenum 12a can be situated about four feet in front of the vertical plenums 12 and 12b, meaning the car can encounter the horizontal plenum 12a first.

Figure 6:
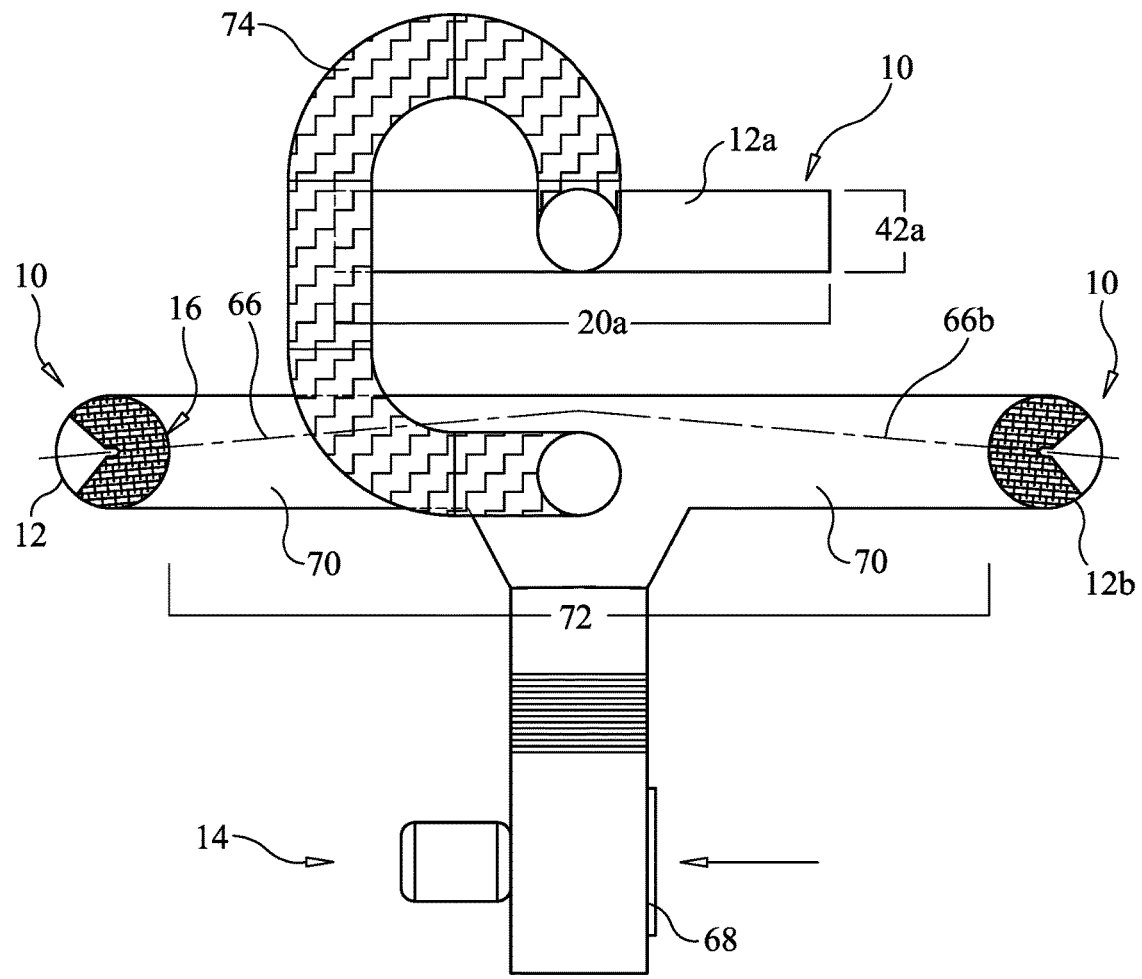
FIG. 6 is an overhead schematic view of a vehicle car wash drying system constructed in accordance with an embodiment of the invention.
Figure 7:
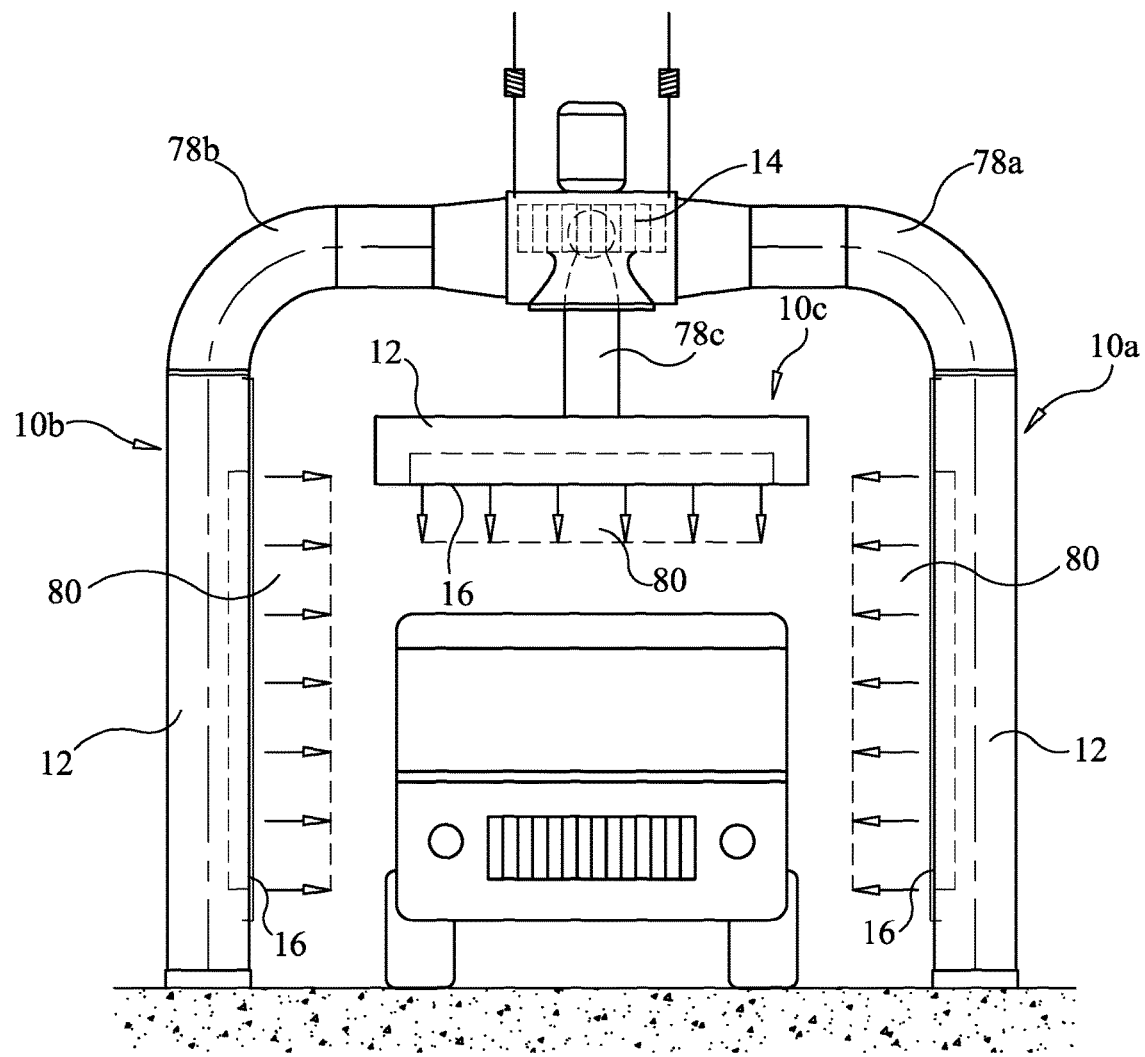
FIG. 7 is a front schematic view of a vehicle car wash drying system constructed in accordance with an embodiment of the invention.

Turning now to FIG. 6, there is there is shown a front schematic view of a car wash dryer system incorporating a plurality of vehicle air dyers 10a, 10b, 10c. As depicted, a pair of vehicle air dryers 10 are vertically oriented and disposed in a horizontally spaced relationship at a distance sufficient to create a passage way for a vehicle to pass between the air dryers. A further depicted a horizontally oriented vehicle air dryer is elevated and extends between the two vertically oriented air dryers. Each vehicle air dyer 10 is fluidically connected to a blower 14 by ducting 78a, 78b, 78c so as to receive air discharged from the blow by the plenum 12. The air is then discharged from the slot nozzle 16 as an elongated high pressure air stream 80 that is directed toward the vehicle. One or more vehicle air dyers, such as vehicle air dryer 10c may be constructed to bend to match the profile of a vehicle exiting the car wash.

Figure 3:
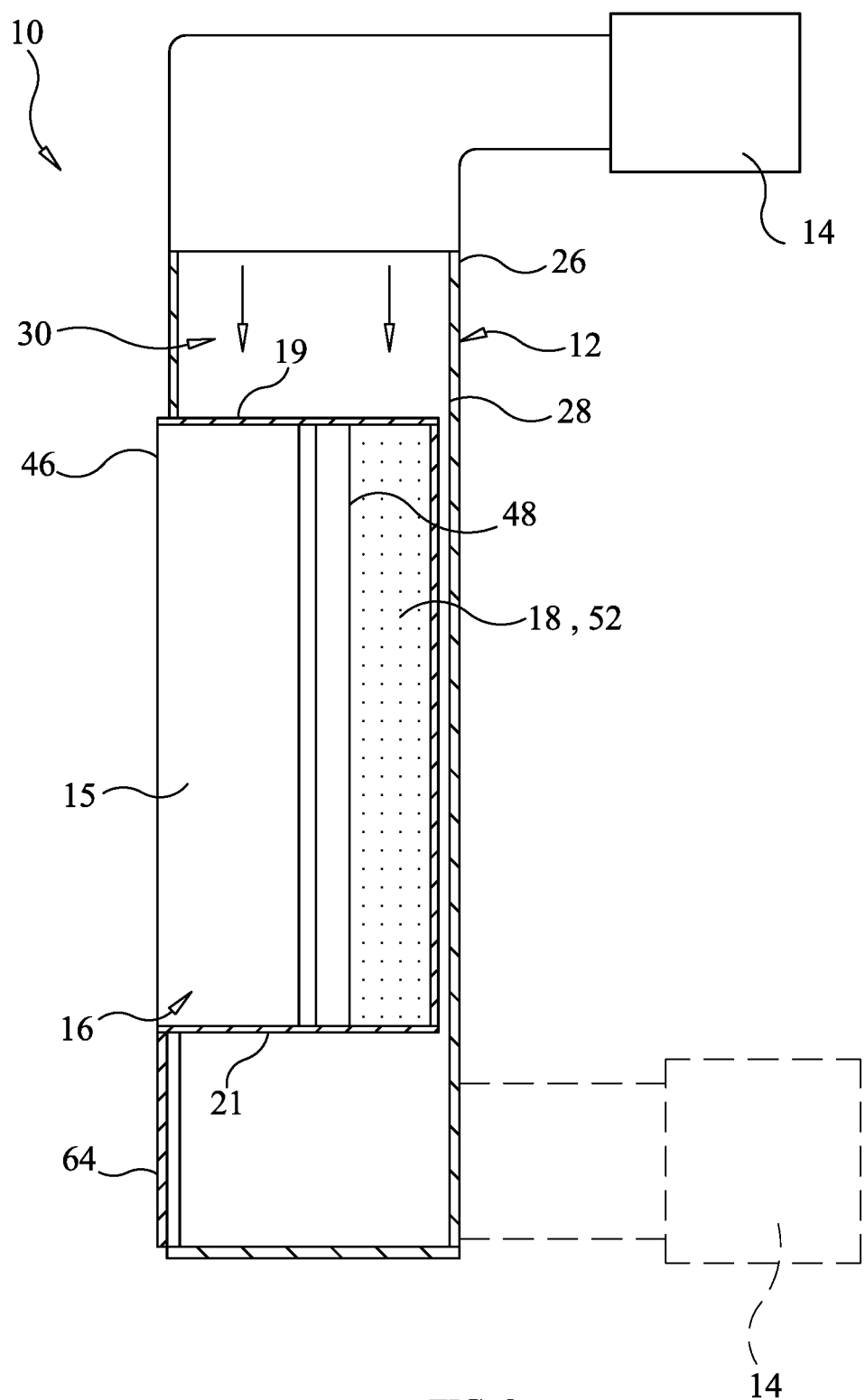
FIG. 3 is a cross-sectional view of the vehicle air dryer taken along line 3-3 in FIG. 1.
Figure 4:
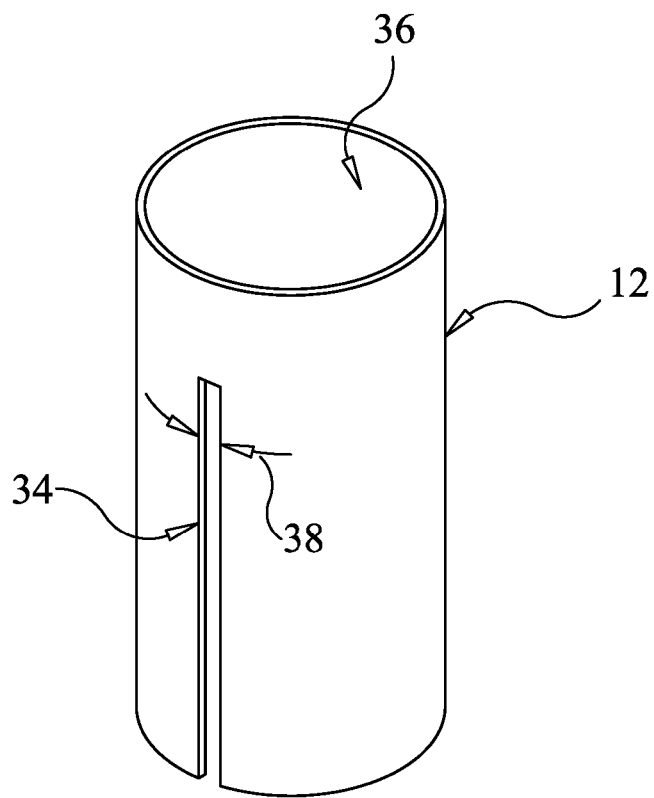
FIG. 4 is a diagrammatic perspective view of a plenum of a vehicle air dryer constructed in accordance with an embodiment of the invention.

While it is not illustrated, it is worth noting that each vehicle air dryer 10 could be individually connected to a separate blower that can be connected to either end of the plenum 12, e.g., in a vertical orientation, the blower could either be a floor mounted blower or a ceiling mounted blower (FIG. 3).

A number of embodiments of the present invention have been described. Nevertheless, it will be understood that various modifications may be made without departing from the spirit and scope of the invention. For example, while the description herein is made in connection with a vehicle air dryer for use in drying a vehicle exiting a car wash, the basic principle described herein can readily be employed in other applications. Such other applications may include an air curtain system supplying air across various building or vehicle openings. In one example, the structures described herein, are readily adaptable for use in an air curtain system supplying air across overhead door systems in industrial buildings. In another example, the structures described herein, are readily adaptable for use in an air curtain system in a larger freezer installation to prevent goods stored in the freezer from being affected by opening and closing a freezer door. In yet another example, the structures described herein, are readily adaptable for use in an air curtain system on an aircraft hangar door opening. Accordingly, other embodiments are within the scope of the following claims.

What is claimed is:

1. A vehicle air dryer comprising:
   a plenum extending a height along a vertical axis between bottom and top ends and having an annular wall extending about said vertical axis, said plenum defining an interior cavity and configured to hold air at a pressure greater than atmospheric pressure, said plenum also defining inlet and outlet ports communicating with said interior cavity;
   a source of pressurized air in fluid communication with said inlet port of said plenum;
   a slot nozzle having an outlet in fluid communication with said outlet port, an inlet spaced from said outlet and in fluid communication with said interior cavity, and an interior passageway extending between said outlet and said inlet;
   said slot nozzle disposed in said interior cavity and dividing said interior cavity into a primary chamber and a secondary chamber, said secondary chamber and said primary chamber extending along said vertical axis and said primary chamber being coextensive with said secondary chamber; and
   said slot nozzle further including a screen extending along said vertical axis and disposed between said inlet of said slot nozzle and said interior cavity.

2. The vehicle air dryer of claim 1, wherein said outlet port of said plenum has a rectangular shape, with a width defined horizontally and a height defined vertically, said height and said width differently sized from one another.

3. The vehicle air dryer of claim 2, wherein said height of said outlet port is greater than said width of said outlet port.

4. The vehicle air dryer of claim 2, wherein said plenum extends a width along a horizontal axis and wherein said width of said outlet port is less than twenty percent of said width of said plenum.

5. The vehicle air dryer of claim 2, wherein said plenum extends a width along a horizontal axis and defines a plenum planar profile of said width of said plenum multiplied by a height of said plenum, wherein said outlet port defines an outlet planar profile of said width of said outlet port multiplied by a height of said outlet port, and wherein said outlet planar profile is less than ten percent of said plenum planar profile.

6. The vehicle air dryer of claim 2, wherein said width of said outlet port is less than five percent of said height of said outlet port.

7. The vehicle air dryer of claim 1, wherein said slot nozzle is positioned within said plenum.

8. The vehicle air dryer of claim 7, wherein said interior passageway of said slot nozzle and said outlet port of said plenum are substantially overlapping.

9. The vehicle air dryer of claim 7, wherein said outlet of said slot nozzle and said outlet port of said plenum are positioned closer to one another than either is positioned relative to said inlet of said slot nozzle.

10. The vehicle air dryer of claim 1, wherein said source of pressurized air is further defined as a fan.

11. The vehicle air dryer of claim 10, wherein said source of pressurized air is further defined as a single fan powered by a twenty horse-power engine.

12. The vehicle air dryer of claim 1, wherein said screen defines a perforation pattern of fifty percent open space.

13. The vehicle air dryer of claim 1, wherein said secondary chamber narrows in width in a plane perpendicular to said vertical axis from a widest width spaced from said inlet of said slot nozzle to a narrowest width proximate to said inlet of said slot nozzle.

14. The vehicle air dryer of claim 1, wherein said slot nozzle further comprises:
   an upper cap and a lower cap; and
   said upper cap spaced from said top end of said plenum along said vertical axis and said lower cap spaced from said bottom end of said plenum along said vertical axis.

15. The vehicle air dryer of claim 1 wherein said screen is further defined as including first and second screen halves, each screen half substantially planar.

16. The vehicle air dryer of claim 1 wherein said annular wall of said plenum is further defined as cylindrical.

17. A vehicle air dryer comprising:
a plenum extending a height along a vertical axis between bottom and top ends and having an annular wall extending about said vertical axis, said plenum defining an interior cavity and configured to hold air at a pressure greater than atmospheric pressure, said plenum also defining inlet and outlet ports communicating with said interior cavity;
a source of pressurized air in fluid communication with said inlet port of said plenum;
a slot nozzle having an outlet in fluid communication with said outlet port, an inlet spaced from said outlet and in fluid communication with said interior cavity, and an interior passageway extending between said outlet and said inlet;
said slot nozzle further including a screen disposed between said inlet of said slot nozzle and said interior cavity;
a secondary chamber defined fluidly between said screen and said inlet of said slot nozzle and in fluid communication with said interior cavity and said inlet of said slot nozzle, said secondary chamber sized smaller than a volume of said interior cavity and larger than a volume defined by said interior passageway of said slot nozzle; and
a plate at least partially enclosing said secondary chamber.

18. The vehicle air dryer of claim 17, wherein said secondary chamber narrows in width in a plane perpendicular to said vertical axis from a widest width spaced from said inlet of said slot nozzle to a narrowest width proximate to said inlet of said slot nozzle.

\* \* \* \* \*